Aug. 19, 1958     R. W. HEER ET AL     2,847,917
ROAD SURFACING MACHINE
Filed Nov. 10, 1954     5 Sheets-Sheet 1
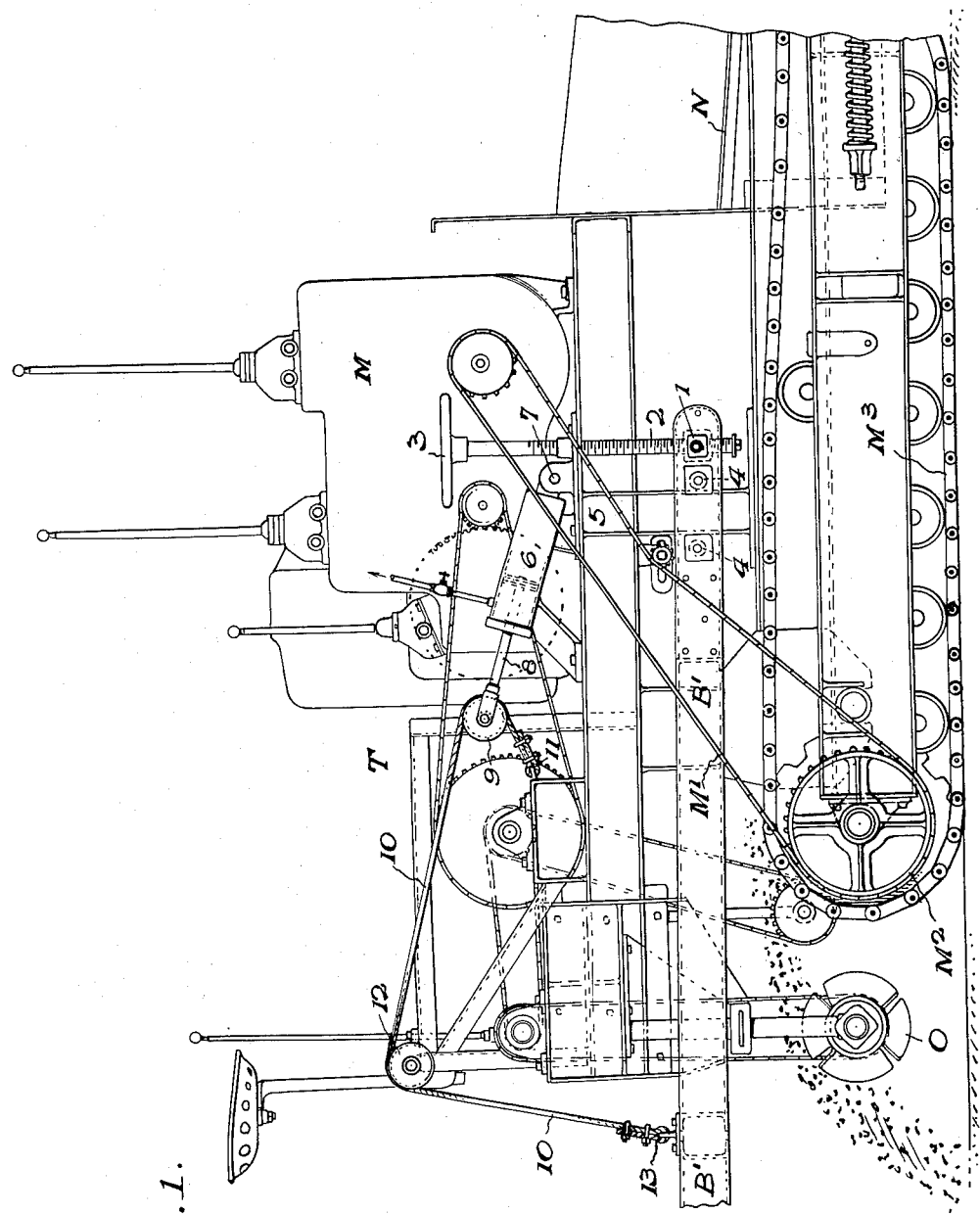
INVENTORS
Ralph W. Heer
Lloyd W. Mundy
Paul G. Kuhn
BY 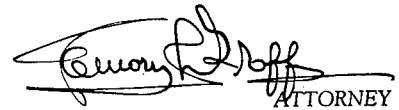
ATTORNEY

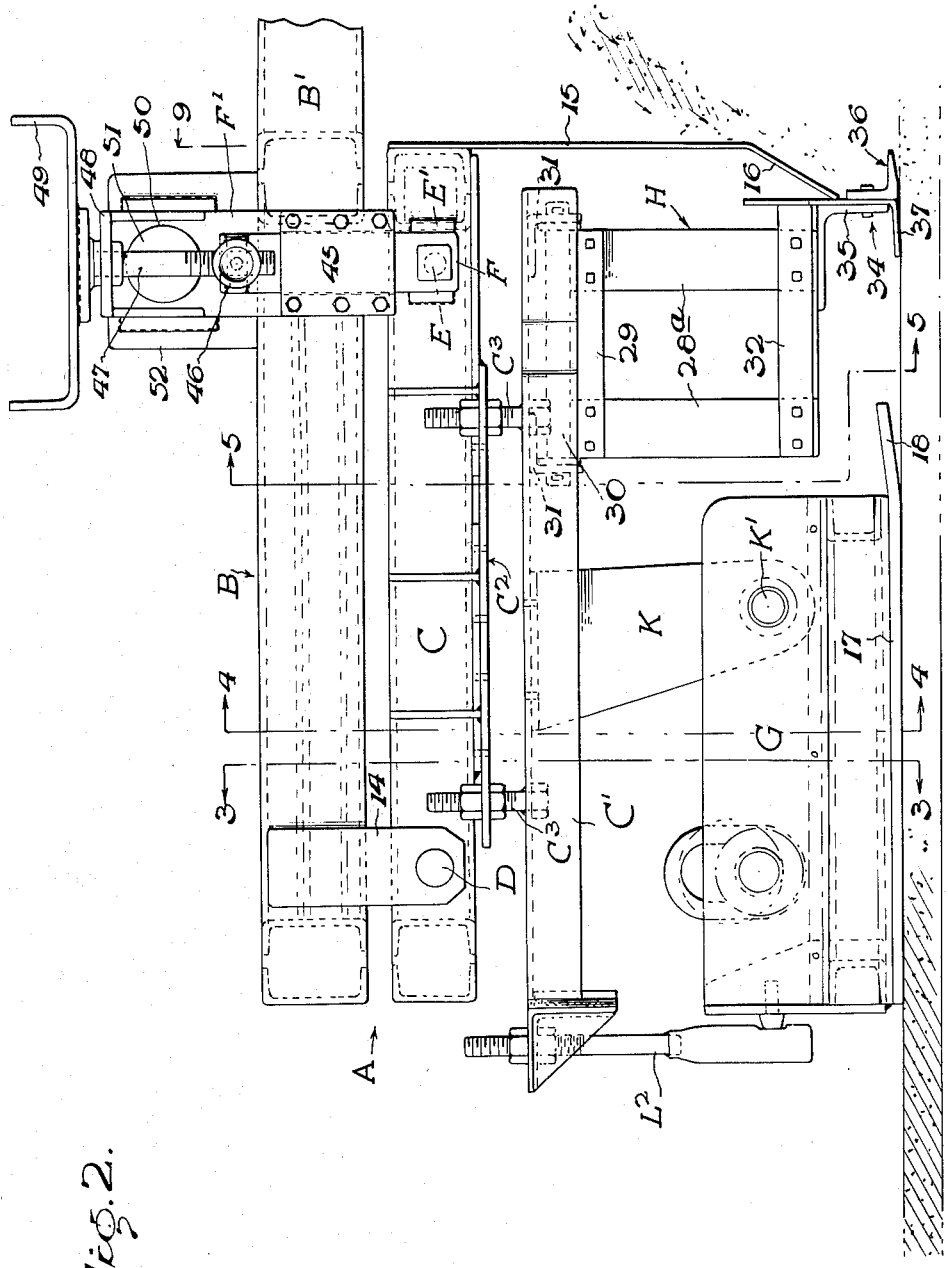

Aug. 19, 1958 — R. W. HEER ET AL — 2,847,917
ROAD SURFACING MACHINE
Filed Nov. 10, 1954 — 5 Sheets—Sheet 3
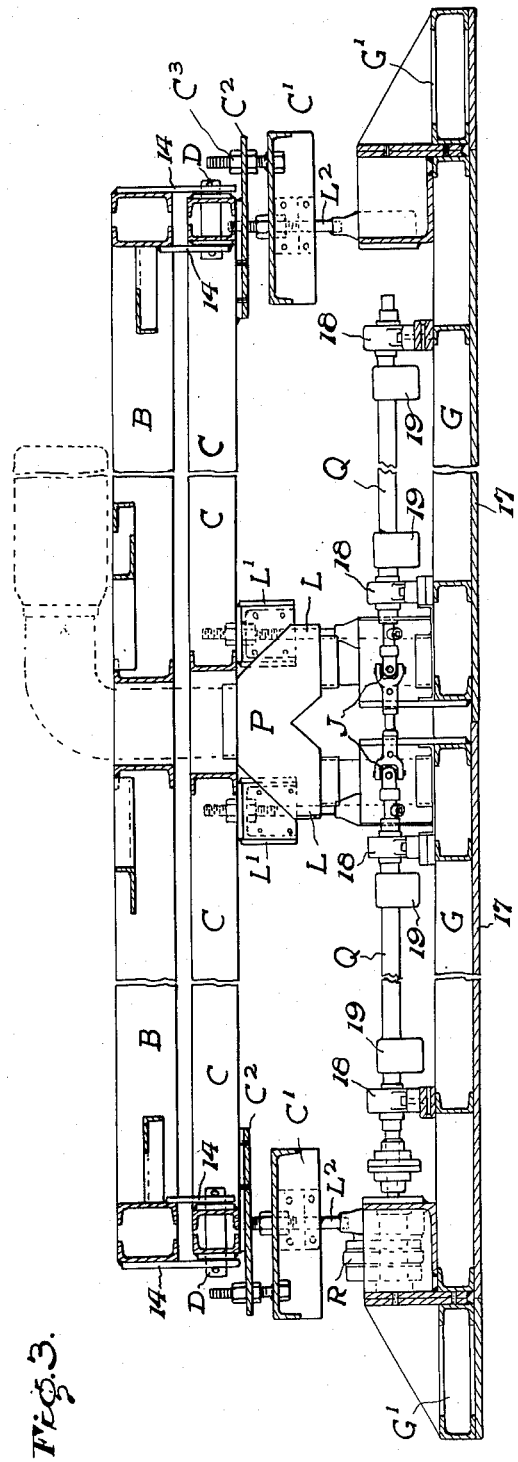
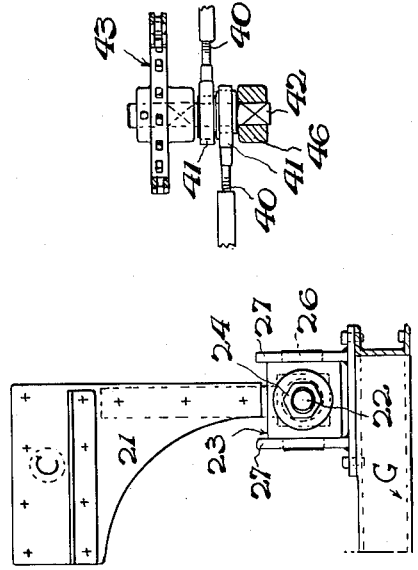
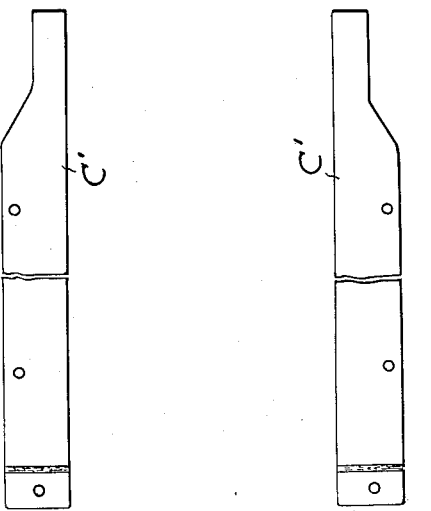
INVENTORS
Ralph W. Heer
Lloyd W. Mundy
Paul G. Kuhn
BY
ATTORNEY

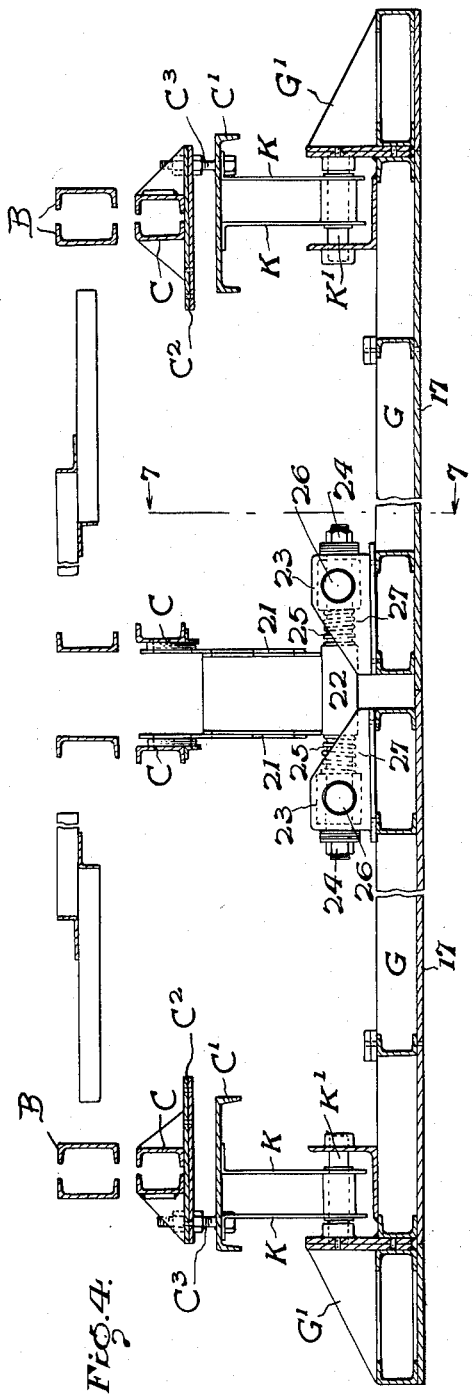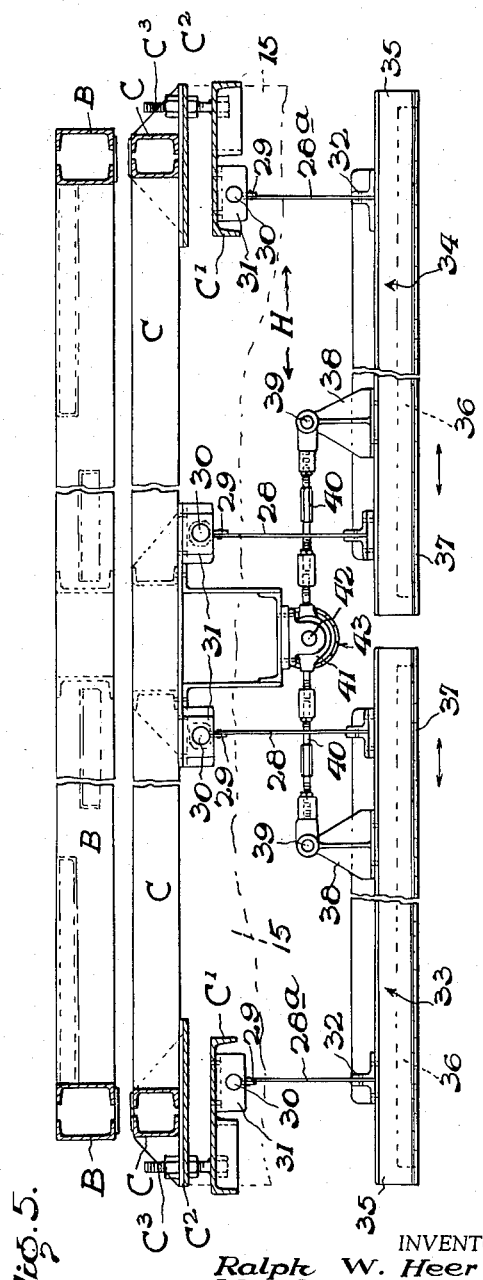
Fig. 4.
Fig. 5.
INVENTORS
Ralph W. Heer
Lloyd W. Mundy
Paul G. Kuhn.
BY
ATTORNEY

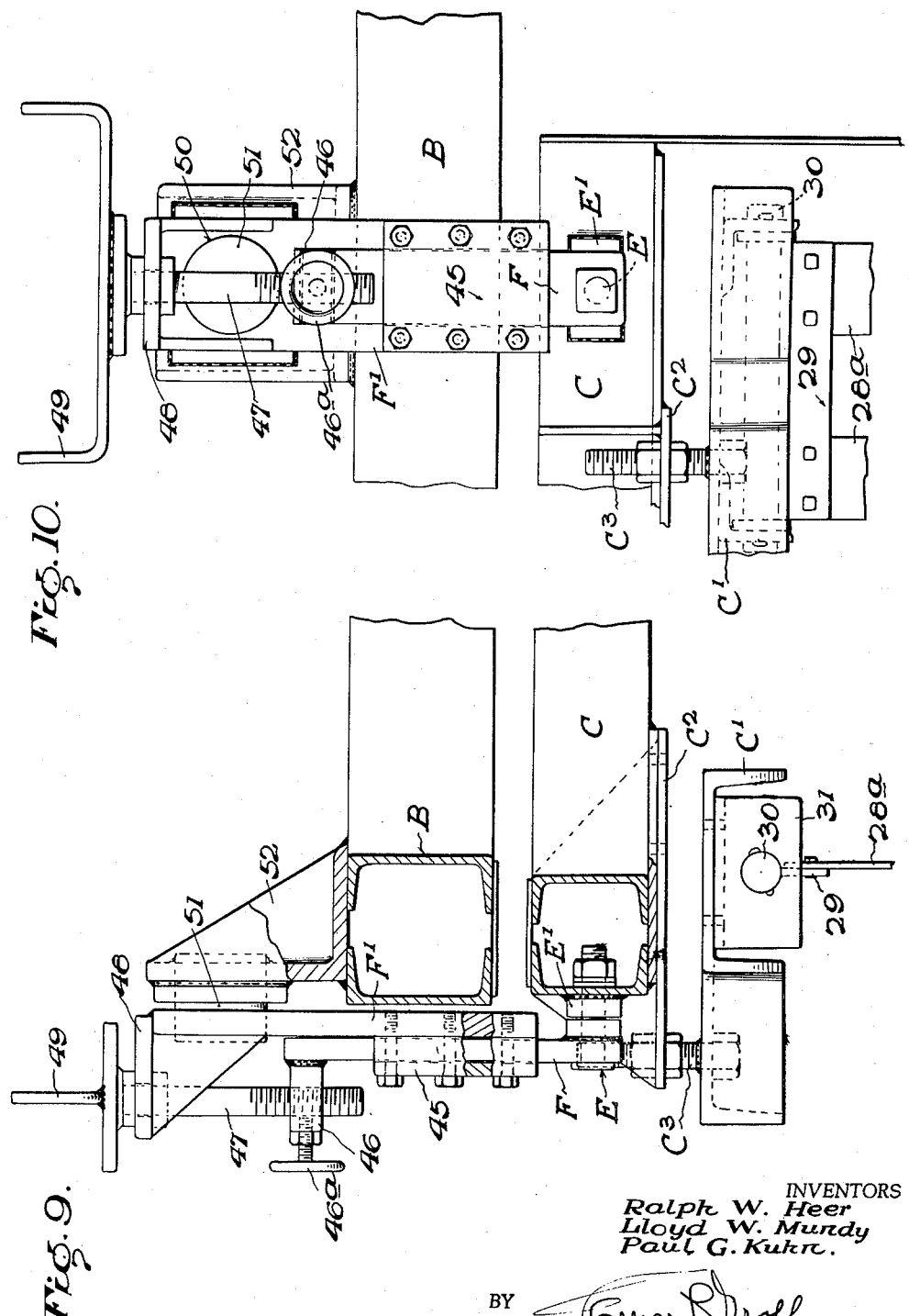

United States Patent Office 2,847,917
Patented Aug. 19, 1958

2,847,917

ROAD SURFACING MACHINE

Ralph W. Heer, Lloyd W. Mundy, and Paul G. Kuhn, Minneapolis, Minn., assignors to Poor & Company, Chicago, Ill., a corporation of Delaware Application November 10, 1954, Serial No. 468,052

4 Claims. (Cl. 94—46)

This invention relates to road surfacing machines, and more particularly to an apparatus for spreading stone or laying bituminous pavement.

One of the objects of the invention is to provide a paving unit including a main frame intended to be towed by tractor and having a sub-frame suspended beneath the main frame, the said sub-frame carrying a sectional vibrating screed, an oscillating strike off and a crowning mechanism.

Another object is to provide a screed which reliably effects maximum compaction of the pavement surface or mat, appropriate power operated means being mounted on the screed providing vibratory movement which may be at a fixed or variable frequency and amplitude.

An additional object is to provide means carried by the main frame and connected to the front end of the sub-frame to raise and lower the elements suspended therefrom to regulate the mat thickness.

A further object is to provide means for supporting the main frame in relation to the tractor so that it may be elevated for travelling when the screed is not in use, or permitted to descend when the screed is in road surfacing position.

A still further object of the invention is to provide means for adjusting the sections of the vibrating screed to obtain a crowned road surface.

Other objects will appear as the nature of the invention is better understood from the following description of the accompanying drawings, in which Fig. 1 is a side elevation of the tractor.

Fig. 2 is an enlarged side elevation of the paving unit and is complementary to Fig. 1 in the respect that the towing arms in the paving unit are shown as continuations in both views so that the connection of the towing arms of said unit with the tractor will be apparent.

Fig. 3 is a vertical sectional view taken approximately on the line 3—3 of Fig. 2 and looking toward the rear of the unit.

Fig. 4 is a vertical sectional view taken approximately on the line 4—4 of Fig. 2, looking toward the front of the unit, and showing the screed sections in elevation.

Fig. 5 is a vertical cross-section taken approximately on the line 5—5 of Fig. 2, looking toward the front of the unit to better illustrate the suspension of the oscillating strike off elements.

Fig. 6 shows, in top plan, the adjustable arms of Fig. 3 carried by the underside of the sub-frame and forming part of the screed crowning means.

Fig. 7 is a fragmentary side elevation of the central screed supporting means shown in Fig. 4.

Fig. 8 is a fragmentary top plan view, partly in section further illustrating the means for imparting horizontal oscillatory movement to the strike off elements.

Fig. 9 is an enlarged detail vertical section of the mat depth regulating means and taken on the line 9—9 of Fig. 2, looking toward the rear of the unit.

Fig. 10 is an enlarged side elevation of the construction shown in Fig. 9.

Similar reference characters designate corresponding parts throughout the several figures of the drawings.

Referring generally to Figs. 1 and 2, it will be noted that the paving unit is designated generally as A, and includes the main frame B whose towing arms B' extend forwardly to be adjustably supported on the tractor T. The sub-frame C is suspended beneath the main frame B from appropriate pivots D near the end of the sub-frame.

The forward portion of the sub-frame C is connected by a pivot E with the lower end of a link F which is vertically adjustable, as will appear later in detail. It will thus be seen that the sub-frame C is pivotally supported near its rear end by the relatively fixed pivots D while its forward or front end is adjustably supported by the slidable links F.

A sectional compacting unit G—G is suspended from the rear of the sub-frame C, and a sectional reciprocating strike off screed element designated generally as H is located in advance of the sectional compacting unit G. The said unit is pivotally suspended from the sub-frame at its front end by depending brackets K through the meduim of the relatively fixed pivots K'. Thus, the compactor sections and the oscillatable strike off elements are both suspended from the sub-frame C, and the subtended adjustable crown controlling arms C' are a part thereof.

The rear end of the compactor unit G is supported by a plurality of pairs of adjusting screws namely, the inner pair L—L whose lower ends are connected to the screed while their upper ends are adjustably connected with the brackets L'—L' mounted on the rear framework of the sub-frame C, and the outer pair $L^2$—$L^2$ whose lower ends are connected to the outer ends of a related section while their upper ends are connected to the said adjustable crown controlling arms C' (Figs. 2, 3 and 6).

The tractor T includes a prime mover M which furnishes driving power through chain M' to the driving sprocket $M^2$ of an endless tread or track $M^3$. The tractor T also includes a feeder designated generally as N for receiving bituminous material from a truck feeding it rearwardly to a spreader screw arrangement O. The track $M^3$, feeder N and spreader screw arrangement O are conventional.

*The main frame*

The main frame B is formed of suitable structural elements to give adequate support and stability to the sub-frame C. The forwardly extending towing arms B', at either side of the frame extend to a towing connection on the tractor T, as will be seen from Fig. 1. That is to say, each of the towing arms B' are provided at their distal ends with a block 1 receiving a screw 2 operated by the hand wheel 3. Turning of the hand wheel will cause the screw shank 2 to vary the elevation of the said distal ends of the arms.

In order to relieve the screw 2 of draft and buffing strains, the said arms B' are also provided with rollers 4—4 which are adapted to engage with either side of the towing column 5. Sufficient space is provided between the rollers 4 and the front and rear sides of the column 5 to provide for the angular adjustment of the distal ends of the arms B' when the elevation of said ends is changed by the screw 2 and hand wheel 3.

As will also be observed from Fig. 1, the frame of the tractor T is provided with a ram including a cylinder 6 pivoted to the tractor frame as at 7 having a piston stem 8 extending from one end thereof. Said stem carries a pulley 9 over which is sheaved a flexible wire rope 10. One end of this rope is anchored at 11 to a fixed part of the tractor frame and the medial portion thereof passes over the fixed pulley 12, also mounted on the frame so that the other extremity 13 of the cable may be anchored to its related towing arm B'. It will, of course, be understood that the arrangement thus described is provided at each side of the tractor frame.

When fluid under pressure is supplied to the cylinder 6 at one side of the piston therein, the pulley 9 will change its position relative to the wire rope 10 whereby, when the pulley 9 is moved forwardly, the pulley 10 will lift the main frame B and when the pulley is relieved of pressure, the main frame will be permitted to descend to selected position.

The sub-frame

The sub-frame C, as previously indicated is suspended at either side thereof from the pivots D. These pivots are mounted in the paired brackets 14 secured to each side of the main frame B (Figs. 2 and 3).

The front end of the sub-frame C is provided with a confining apron 15 which is to the rear of the distributing screw O, and includes a downwardly and rearwardly inclined directing portion 16 for feeding the bituminous material to the oscillating strike off unit H.

The compactor unit

The compactor unit G is made in two sections each provided on its lower face with a screed plate 17 whose front end 18 is turned upwardly to insure receiving bituminous material from the strike off H.

As will be seen from Figs. 3 and 4, the compactor sections are of suitable hollow formation to receive heated air from the hot air circulating system designated generally as P to insure plate 17 making a smooth surface when the apparatus is laying bituminous mat.

The compactor sections G—G are supported at their inner rear ends by the aforesaid pair of inner adjustable screws L—L (Fig. 3) and are also supported at their outer rear ends by the outer pair of screws L²—L². The upper ends of the inner screws L—L are mounted in brackets L' carried by one of the transverse elements of the sub-frame C. On the other hand, the outer pair of screws L²—L² have their upper ends connected to the adjustable crowning arms C'—C' suspended by plates C² on the sides of the sub-frame C by the screws C³. This arrangement makes it possible to not only adjust the elevation of the outer ends of each compactor section relative to the inner abutting ends of said sections to adjust them relative thereto to effect the desired degree of crown to the road surface.

For the purpose of providing vibration of the desired frequency to the compactor sections through the plate 17, the upper portion of the compactor unit frame carries the flexibly connected shaft sections Q—Q, the same being journaled in the bearings 18 and medially connected by the universal joint elements J. As will be observed from the left hand side of Fig. 3, the shaft sections Q—Q are operated through a suitable coupling by a motor, preferably a fluid motor designated generally as R, thereby to impart desired vibratory motion to both sections. The portions of the shaft sections Q—Q between the bearings 18 are provided with eccentric weights 19 so that as the shaft sections are rotated by the fluid motor R high frequency vibrations will be imparted thereto to insure the screed plate 17 of each section compacting the bituminous material.

As will also be observed from Fig. 3, the compactor sections G—G may be provided at their outer ends with the compactor extensions G'.

The compactor sections G—G are suspended at their outer forward ends from the sub-frame C by the brackets K—K on the pivots K', said brackets being carried by the crown adjusting arms C' as shown in Fig. 4.

The juxtaposed inner ends of the compactor sections G are supported and connected by the hanger plates 21—21 whose upper ends are connected to the medial portion of the sub-frame C as shown in Figs. 4 and 7. At the lower end of the hangers 21 there is provided a stub shaft 22 secured in the lower extremity of the hangers 21 by welding or the like. This shaft is of reduced diameter at either side of its medial portion and receives thereon the trunnion elements 23 secured thereon by the nuts 24 against the tension of the coil springs 25 which are passed over the reduced portions of the stub shaft 22. Each of the trunnions 23 are of block formation and have the latterally extending trunnion portions 26 which are engaged with appropriate openings in the plates 27 rigidly secured to the upper portion of the screed sections G—G.

With the above arrangement, it will be seen that the inner juxtaposed ends of the compactor sections G—G will be held in flush abutting engagement due to the nuts 24 compressing springs 25, while relative angular adjustment of the screed sections to effect crowning of the road may be effected by the adjustment of the arms C'—C'.

The strike off

The strike off means H, as will be seen from Figs. 2 and 5, is suspended directly from the sub-frame C by an inner pair of leaf spring hangers 28—28 and also by an outer pair of similar hangers 28ª—28ª whose upper ends are connected to the adjustable crowning arms C'—C'. The upper ends of the hangers 28—28 and 28ª—28ª are secured in each instance to the radial leaf 29 of a sleeve surrounding a pin 30 mounted in suitable supporting plates 31 respectively carried by the underside of the sub-frame C at the medial portion thereof and to the underside of the crowning arms C'. The lower ends of the hangers 28 are secured by angle bars 32 to the sections 33 and 34 of the individual strike off elements. Each of the strike off elements 33 and 34 are provided at their leading edge with an angle member 35 which in turn carries a serrated blade 36 which preferably has a plurality of teeth or fingers for slicing through the mass of bituminous material without rolling the stones therein as it is dumped in front of the apron 15—16. The rear edge of the blade 36 may be provided with a rearwardly extending trowelling member 37 which preliminarily smooths out and initially compacts the material being fed under the upturned leading edge 18 of the screed plate 17. As will be observed from Fig. 5, the strike off elements 33 and 34 are each supported by their own pairs of flexible hangers, and the inner ends thereof are spaced so that movement of 33 and 34 in opposite directions will be possible.

In order to effect the horizontal reciprocation of the strike off elements 33 and 34, the upper portions thereof are provided with brackets 38. The upper ends of these brackets are pivotally connected as at 39 with longitudinally adjustable arms 40 whose inner ends are mounted on a pair of eccentrics 41 mounted on shaft 42 which is driven by sprocket 43 (Figs. 5 and 8) connected by a chain drive with a fluid motor, not shown.

With the foregoing construction, the strike off sections 33 and 34 will both move outwardly and then both move inwardly so that they are in effect moving in opposite directions to more effectually prepare the mixture for the screed sections G—G.

Mat thickness regulation

Referring to Figs. 2, 9 and 10, it will be observed that the link F having its lower end mounted on pivot E secured in bracket E¹ extends upwardly and slidably through the guide 45 carried by the outer side of the suspension member F¹. The link F is provided at its upper end with a laterally offset threaded eye 46 including a set screw 46ª, said eye receiving a screw 47 rotatably mounted in the bracket 48 and having a turning handle 49. The upper end of the suspension member F¹ is provided with an opening 50 to receive a bearing stud 51 rigidly carried by the angle bracket 52 secured to the main frame B. There is sufficient lateral play between link F and the inner sides of guide 54 so that when the link F is raised and lowered by screw 47 said link and suspension member F³ may have relative angular movement about pivot E and stud 51 to compensate for the change of angularity between main frame B and sub-frame C.

It will thus be seen that the sub-frame C may be raised and lowered at its front end independently of the main frame B relative to pivot D by operating screw 47 through the medium of handle 49. When the sub-frame C has its front end lifted, as above described, it will of course be understood that the compactor unit sections G—G and the sections of the oscillating strike off H are also simultaneously raised together, although it must be understood that the material engaging elements 36 and 37 of the oscillating strike off are always disposed below the upturned leading edge or toe portion 18 of the screed plates 17 so as to insure positive initial feeding of material beneath the compactor sections and also insure proper compaction by the main body of the vibrating compactor sections.

The medial pair of screw elements L—L and the outer pair of screw elements L²—L² at the heel of the screed sections G—G are primarily intended for adjusting the relative positions of said screed sections about the reduced end portions of stub shaft 22, as well as the pivots K' (Figs. 4 and 7). Once this adjustment has been made, there is little or no necessity for changing it unless some operating condition is altered, such for example as the requirements of different jobs, or when working with different materials.

The adjustment above described having been made, the pitch, that is the inclination of the compactor sections with respect to forward travel of the machine, remains fixed relative to the oscillating strike off elements 33—34. The material flowing below the trowel plate 37 is directed beneath the upturned toe 18 of the screed sections and is compacted by the body of the compactor sections due to their vibration and weight, to produce a mat of given thickness.

If it is desired to change the depth of the mat, the sub-frame C is raised at its front end by links F on pivot D, with the result that the strike off elements 33—34 are elevated to permit a greater depth of material to proceed to the compactor sections, which, also acquire a greater pitch relative to the ground line, thereby to adequately compact the additional material by vibration and weight of the screed sections. In other words, since the compactor sections G—G and the strike off elements H—H are both carried by the sub-frame C, the latter's adjustment by links F renders simultaneous adjustment of all these elements, and the strike-off regulates the depth of the mat.

When it is desired to change the longitudinal angularity of the screed sections to effect the desired crown of the road surface, the bolts C³ on either side of the machine are manipulated to increase the distance between the sub-frame C and the crowning arms C' on each side of the said sub-frame. By increasing the space at the points just mentioned and holding the center compactor supports 21—25 constant and pivoting on the trunnions 26 (Figs. 4 and 7) the desired crown is developed between the two compactor sections. The amount of crown can be measured by the increase in the space or distance between the crowning arms C and the plates C².

We claim:

1. A road surfacing machine, comprising, in combination, a tractor, a main frame having forwardly projecting arms pivotally connected to the tractor, said main frame including a relatively horizontally disposed body portion extending substantially to the rear of the arms, a sub-frame below the main frame and in substantially vertical registry therewith, means suspended from the rear side portions of the main frame pivotally supporting the rear portion of the sub-frame, a compactor unit having its front end pivotally suspended from the sub-frame a fixed distance forwardly of said rear connection of said sub-frame with the main frame, means for adjustably supporting the rear end of the compactor unit from the sub-frame, means for vibrating the compactor unit, sectional strike-off elements mounted for lateral oscillating movements from the front end of the sub-frame and in advance of the compactor unit, and adjustable means between the forward side portions of the main frame and the sub-frame for raising and lowering the front end of the sub-frame, whereby the raising and lowering of the front end of the sub-frame relative to the main frame and the road line will increase or diminish the height of the strike-off elements relative to said road line while the relationship of the elements remains fixed with respect to the compactor unit to thereby regulate the thickness of the mat.

2. A road surfacing machine, comprising, in combination, a tractor, a trailing surface paving unit including, a main frame composed of laterally spaced side members and longitudinally spaced front and rear structural members and having arms extending from the side members and forwardly of the front member, said arms embracing the tractor and having their forward end pivotally connected with the tractor, a sub-frame also composed of laterally spaced side members and longitudinally spaced front and rear structural members in substantially vertical registry with the corresponding parts of the main frame, a bracket on each side member of the main frame, pivot means connecting the rear of the sub-frame with said brackets, means on each of the side members of the main frame and connected with the front end of the side members of said sub-frame for selectively vertically raising or lowering the front end of the sub-frame about its related points of pivotal support on the brackets and independently of the main frame, a compactor unit extending across the width of the main and sub-frames and beneath the same, means adjustably suspending the rear of the compactor unit from the sub-frame for vertical adjustment relative thereto, means pivotally supporting the front end of the compactor from the sub-frame, whereby the angular position of the compactor unit about said last mentioned means may be controlled, means for imparting high frequency vibrations to the said unit, and strike-off means carried by the sub-frame in advance of the compactor unit.

3. A road surfacing machine, comprising, in combination, a tractor, a trailing surface paving unit including a rectangular main frame composed of laterally spaced side members and longitudinally spaced front and rear members and having arms extending forwardly of the front member disposed at opposite sides of the tractor and whose forward ends are pivotally connected with the tractor, a rectangular sub-frame also composed of laterally spaced side members and longitudinally spaced front and rear members and disposed in substantially vertical registry with the corresponding parts of the main frame, a bracket on each side member of the main frame pivotally supporting the rear portion of the sub-frame beneath the main frame, adjusting means on each side of the main frame and each connected with the front portion of the sub-frame for vertically raising or lowering the related front end of the latter about the related pivotal connection with said brackets and independently of the position of the main frame, a sectional compactor unit having its forward end pivotally suspended below the sub-frame, adjustable screw means connecting the rear end of the sub-frame and the rear ends of the sections of the compactor unit, means for imparting high frequency vibrations to the said unit, and an oscillatable strike-off means carried by the sub-frame in advance of the compactor unit, said strike-off means including two horizontally movable elements each pivotally suspended from the sub-frame, and means for oscillating said strike-off sections in opposite directions.

4. A road surfacing machine according to claim 3, wherein, the two horizontally movable sections of the strike-off means are suspended from the sub-frame by leaf springs whose upper ends are mounted on the radial leaf of a sleeve supported by a pin in the sub-frame.

References Cited in the file of this patent

UNITED STATES PATENTS

| | | |
|---|---|---|
| 2,094,910 | Baily | Oct. 5, 1937 |
| 2,351,593 | Barber | June 20, 1944 |
| 2,358,085 | Millikin | Sept. 12, 1944 |
| 2,511,589 | Jaeger | June 13, 1950 |
| 2,589,256 | Horning | Mar. 18, 1952 |
| 2,601,277 | Green | June 24, 1952 |